(12) United States Patent
Tsutsumi et al.

(10) Patent No.: US 8,859,082 B2
(45) Date of Patent: Oct. 14, 2014

(54) RECORDING MEDIUM (71) Applicant: Fuji Xerox Co., Ltd., Tokyo (JP)

(72) Inventors: Kojiro Tsutsumi, Kanagawa (JP); Katsumi Harada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/682,310

(22) Filed: Nov. 20, 2012

(65) Prior Publication Data
US 2013/0273299 A1 Oct. 17, 2013

(30) Foreign Application Priority Data
Apr. 12, 2012 (JP) ................. 2012-091087

(51) Int. Cl.
| B32B 1/00 | (2006.01) |
| B32B 3/00 | (2006.01) |
| B32B 3/14 | (2006.01) |
| B32B 3/26 | (2006.01) |
| B32B 3/10 | (2006.01) |
| B32B 7/00 | (2006.01) |
| B32B 3/28 | (2006.01) |

(52) U.S. Cl.
CPC . *B32B 3/10* (2013.01); *B32B 3/263* (2013.01); *B32B 7/005* (2013.01); *B32B 3/28* (2013.01)
USPC ............................................. 428/174; 428/78

(58) Field of Classification Search
USPC ............ 428/156, 167, 121, 130, 124, 78, 174
See application file for complete search history.

(56) References Cited

U.S. PATENT DOCUMENTS

| 2002/0185857 A1* | 12/2002 | Taylor et al. | ...................... 283/72 |
| 2005/0082820 A1* | 4/2005 | Nelson et al. | .................. 283/83 |
| 2010/0001451 A1* | 1/2010 | Nishimura | ....................... 270/37 |

FOREIGN PATENT DOCUMENTS

JP A-2001-205936 7/2001

* cited by examiner

*Primary Examiner* — Catherine A Simone
(74) *Attorney, Agent, or Firm* — Oliff PLC (57) ABSTRACT

A recording medium includes a film that has a recording surface on which an image is recorded. The film includes a fold line that is provided in advance at a position where the film is folded when the film is processed into a folder.

3 Claims, 10 Drawing Sheets

RECORDING MEDIUM

CROSS-REFERENCE TO RELATED APPLICATIONS

This application is based on and claims priority under 35 USC 119 from Japanese Patent Application No. 2012-091087 filed Apr. 12, 2012.

BACKGROUND

Technical Field

The present invention relates to a recording medium.

SUMMARY

According to an aspect of the invention, there is provided a recording medium including a film that has a recording surface on which an image is recorded, the film including a fold line that is provided in advance at a position where the film is folded when the film is processed into a folder.

BRIEF DESCRIPTION OF THE DRAWINGS

Exemplary embodiment of the present invention will be described in detail based on the following figures, wherein.

DETAILED DESCRIPTION

Hereinafter, an exemplary embodiment of the present invention will be described with reference to the figures.

(Configuration of a Recording Medium)

Figure 1A:
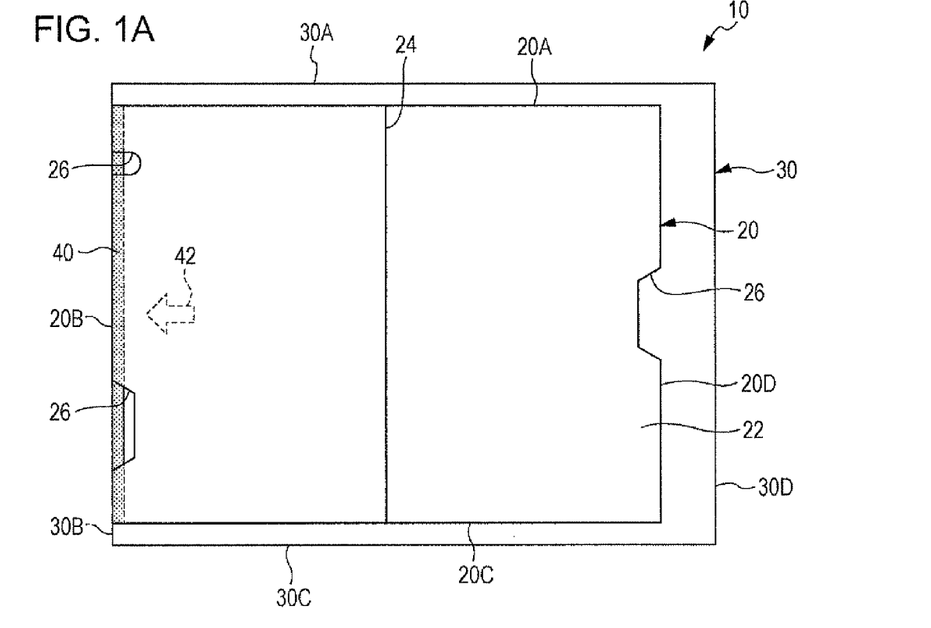
FIGS. 1A and 1B are a plan view illustrating the configuration of a recording medium according to the exemplary embodiment, and a side view illustrating the configuration of the recording medium according to the exemplary embodiment, respectively.
Figure 1B:
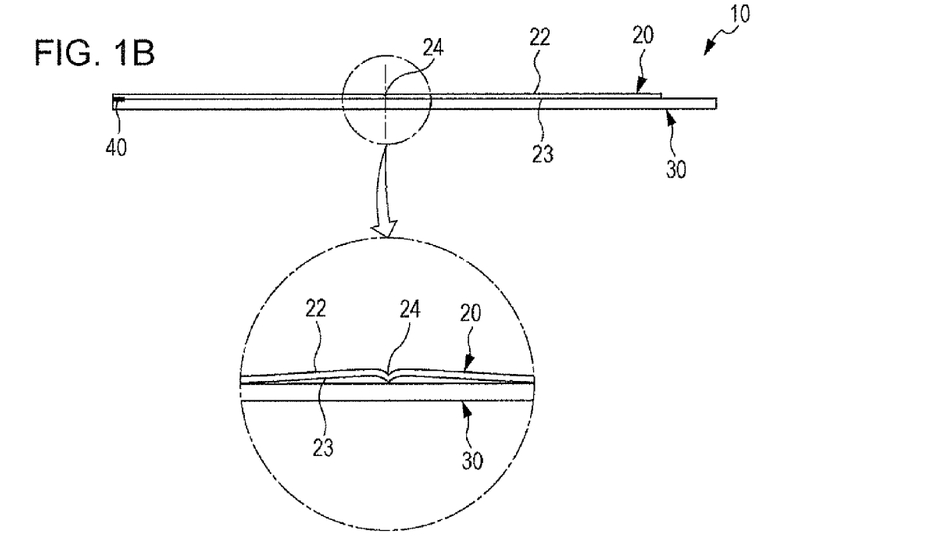

First, an exemplary embodiment of the present invention will be described. FIGS. 1A and 1B each schematically illustrate the configuration of a recording medium according to the exemplary embodiment.

A recording medium 10 is, for example, a recording medium on which an image is recorded by an electrophotographic image recorder (printer). As illustrated in FIGS. 1A and 1B, the recording medium 10 includes a film 20 and a mount 30.

The film 20 is a film in an unfolded state prior to being processed into a clear folder as an example of a folder. The film 20 has a rectangular shape. The length of long sides 20A, 20C of the film 20 is, for example, 440 mm, and the length of short sides 20B, 20D of the film 20 is, for example, 312 mm. The film 20 is made of a resin material such as polyethylene terephthalate (PET) or polypropylene (PP), and transmits light.

While the lengths of the long sides 20A, 20C and short sides 20B, 20D of the film 20 are set to lengths suitable for holding A4 size documents, their lengths are not limited to these lengths. For example, the lengths of the long sides 20A, 20C and short sides 20B, 20D may be set to lengths suitable for holding A5 size documents.

A clear folder refers to a folder that is formed by overlapping two films (sheets) made of resin material, and holds a document or the like between the two films when in use. The films (sheets) may be opaque. Further, a pocket(s) may be affixed to each of the films (sheets).

The film 20 has a recording surface 22 on one side (specifically, front side (top side)). An image is recorded on the recording surface 22. Further, the film 20 has a fold line 24 provided in advance at the position where the film 20 is folded when processed into a clear folder. Specifically, as illustrated in FIG. 1A, the fold line 24 is formed at the center part with respect to the longitudinal direction. As illustrated in enlarged view in FIG. 1B, the fold line 24 is valley folded with respect to the recording surface 22. The fold line 24 is formed by, for example, folding the film 20 once, applying pressure to the portion that becomes the fold line, and unfolding the folded film 20. Further, the short sides 20B, 20D of the film 20 are provided with notches 26. The notches 26 allow for easy opening of a clear folder when the film 20 is processed into the clear folder.

The mount 30 is formed in a rectangular shape somewhat larger in size than the film 20. The length of long sides 30A, 30C of the mount 30 is, for example, 450 mm, and the length of short sides 30B, 30D is, for example, 330 mm. The mount 30 extends outside the film 20 along two long sides 20A, 20C and one short side 20D of the film 20. Specifically, the mount 30 extends outside the film 20, at the trailing edge (short side) 20D and both lateral edges (long sides) 20A, 20C with respect to the direction in which the recording medium is transported when an image is recorded on the recording surface 22 of the film 20. The length of the mount 30 extending outside the film 20 is, for example, 9 mm at the lateral edges 20A, 20C and, for example, 10 mm at the trailing edge 20D.

The lengths of the long sides 30A, 30C and short sides 30B, 30D of the mount 30, and the length of the mount 30 extending outside the film 20 are not limited to the above-mentioned lengths but may be set to various lengths. Further, in the mount 30, the leading edge (short side) 30B with respect to the direction in which the recording medium is transported when an image is recorded on the recording surface 22 of the film 20 is located at substantially the same position as the leading edge (short side) 20B of the film 20.

The mount 30 is releasably stuck on an opposite surface 23 of the film 20 opposite to the recording surface 22. Specifically, the mount 30 is temporarily fastened along the short side 30B (leading edge side with respect to the transport direction) by a temporary fastening member 40 having heat resistance (e.g. a tape or adhesive (glue)). The temporary fastening member 40 bonds more strongly to the mount 30 than to the film 20 so that upon releasing the film 20 from the mount 30, the temporary fastening member 40 remains on the mount 30.

The mount 30 and the film 20 do not need to be temporarily fastened together over the entire short side 30B (leading edge with respect to the transport direction). For example, it is also possible to provide the temporary fastening member 40 at two positions on the short side 30B (leading edge with respect to the transport direction), one near the long side 20A and the other near the long side 20C, and temporarily fasten the mount 30 and the film 20 together by the temporary fastening member 40 provided at the two positions.

To ensure that the recording medium 10 is stored (set) in the electrophotographic image recorder (printer) with the short side 30B facing toward the leading edge with respect to the transport direction, a mark 42 indicating the storage direction (setting direction) with respect to the electrophotographic image recorder (printer) may be affixed to the mount 30.

(Method of Processing the Recording Medium 10 into a Clear Folder)

Next, a method of processing (manufacturing) the recording medium 10 into a clear folder will be described.

Figure 2A:
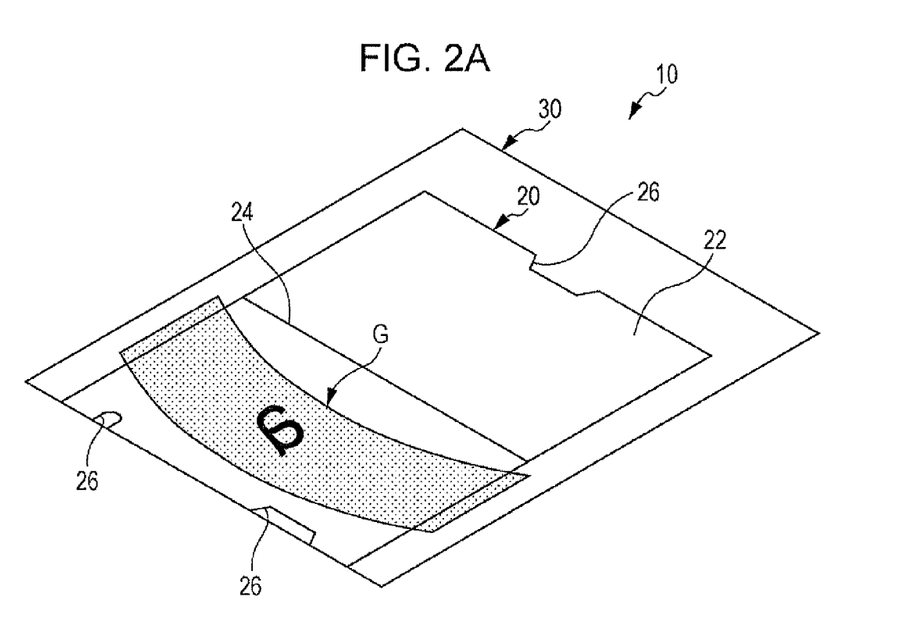
FIGS. 2A and 2B are perspective views illustrating a processing method (processing procedure) for processing the recording medium according to the exemplary embodiment into a clear folder.

In this processing method, first, as illustrated in FIG. 2A, an image G is recorded as a mirror image on the recording surface 22 of the film 20 of the recording medium 10 by an electrophotographic image recorder (printer). The image G is recorded as a mirror image because this image G will be recorded on the inner surface of the completed clear folder.

Figure 2B:
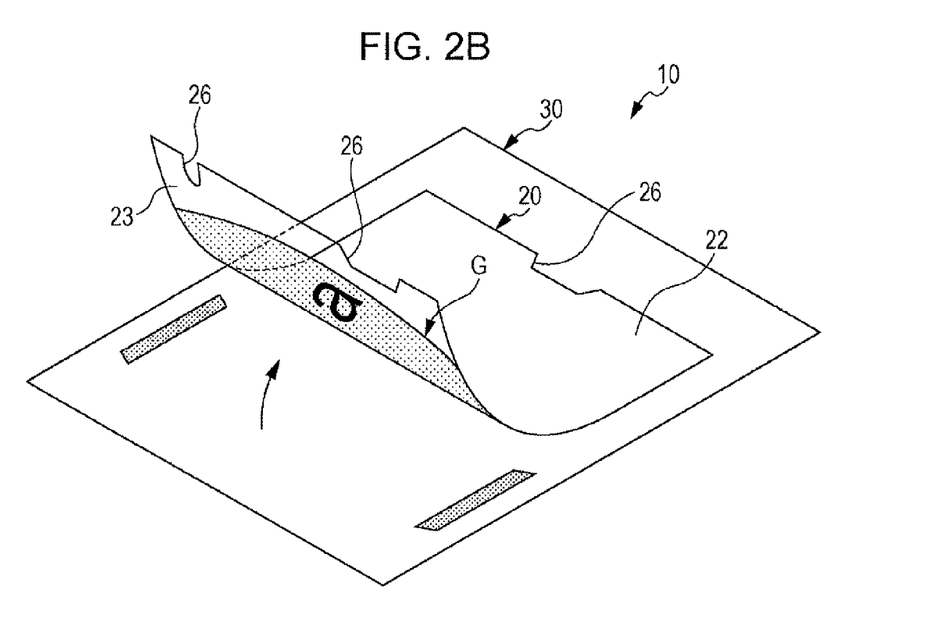
Figure 3A:
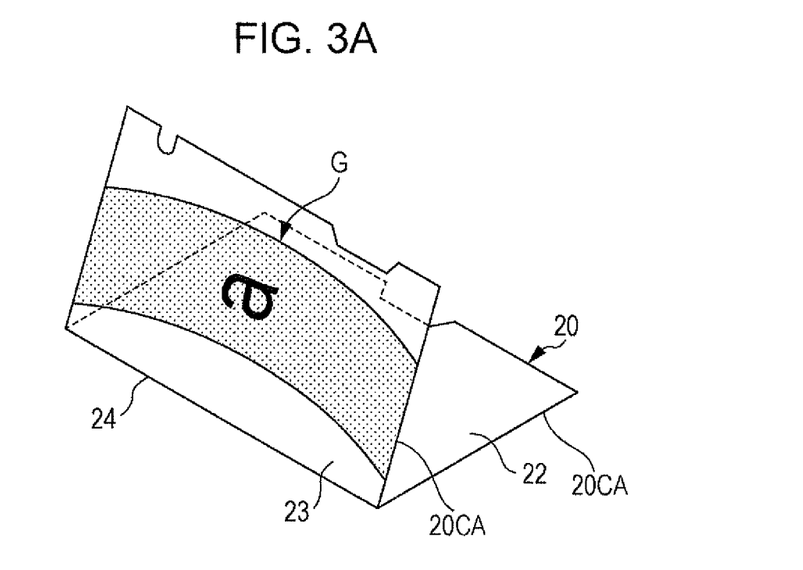
FIGS. 3A and 3B are perspective views illustrating a processing method (processing procedure) for processing the recording medium according to the exemplary embodiment into a clear folder.

Next, as illustrated in FIG. 2B, the film 20 is released from the mount 30. Next, as illustrated in FIG. 3A, the film 20 is folded along the fold line 24 (folded in half).

Figure 3B:
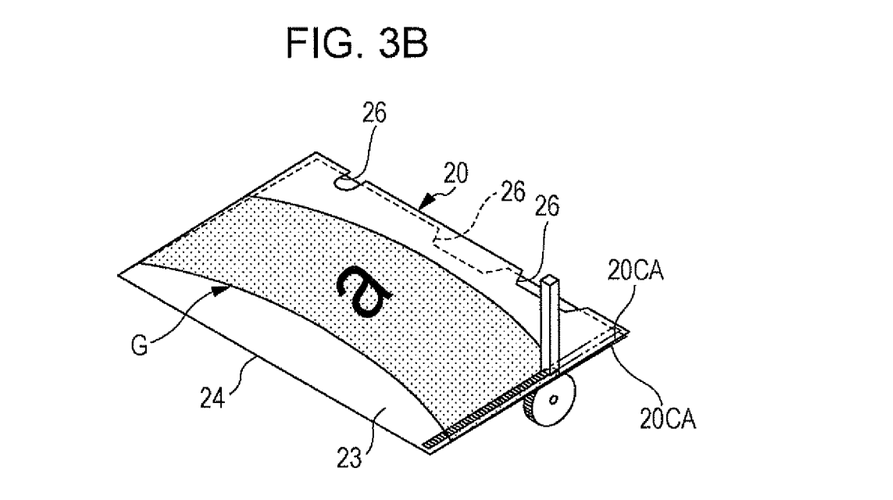

Next, as illustrated in FIG. 3B, short sides 20CA of the film 20 in the folded state (the long side 20C in the unfolded state (see FIG. 1A)) are bonded together by, for example, ultrasonic welding. In this way, the film 20 is processed into a clear folder.

As described above, in the exemplary embodiment, the film 20 is folded along the fold line 24. Therefore, it is easy to process the film 20 into a clear folder as compared with a case in which the fold line 24 is not provided.

In a state in which the film 20 has been processed into a clear folder, the image G recorded on the film 20 is located on the inner side of the clear folder, and not easily touched from the outside. As a result, degradation of the image G due to rubbing is reduced. Further, in a state in which the film 20 has been processed into a clear folder, the image G recorded on the film 20 is located on the inner side of the clear folder, and seen from the outer side of the clear folder through the film 20. The resulting laminate effect due to the film 20 causes the image G to be seen as a lustrous image.

Figure 4:
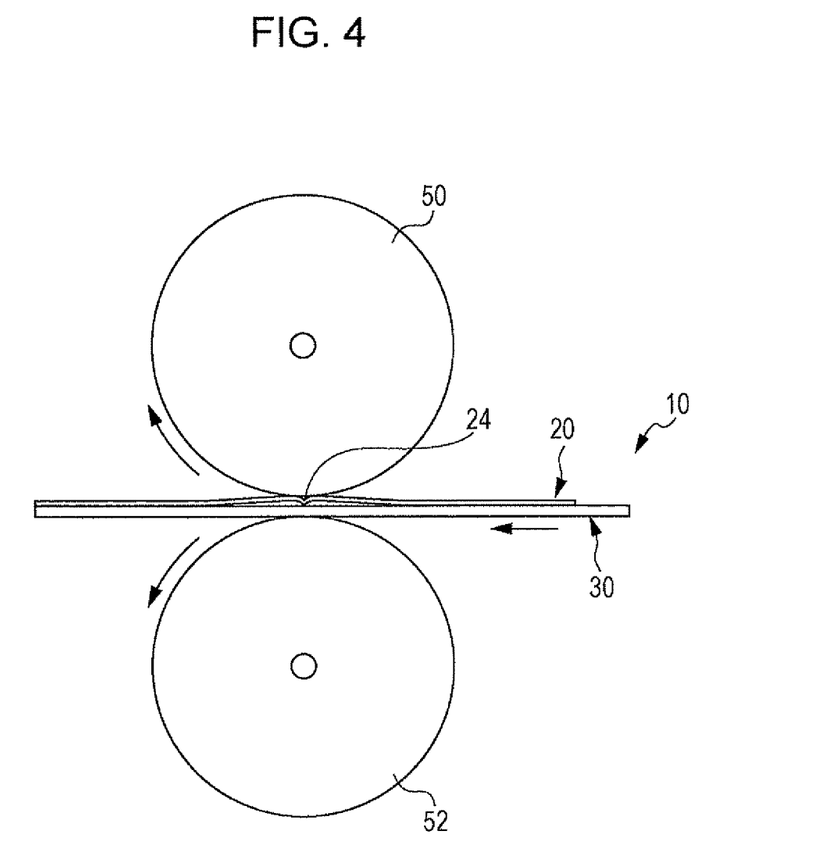
FIG. 4 schematically illustrates an example of how an image is transferred to the recording medium according to the exemplary embodiment.

Further, for example, a case is considered in which as illustrated in FIG. 4, an image is transferred from an image carrier 50 carrying the image to the film 20, while nipping and transporting the film 20 by the image carrier 50 and an opposed member (opposed roller) 52 opposed to the image carrier 50. In this case, because the fold line 24 of the film 20 is valley folded with respect to the image carrier 50, as compared with a case in which the fold line 24 is mountain folded, the film 20 is less likely to get caught on the image carrier 50, and the film 20 is smoothly transported, thereby reducing misregistration of the transfer position of the image G, or the like. The image carrier 50 is, for example, a photoconductor drum, an intermediate transfer belt, or an intermediate transfer drum.

Figure 5A:
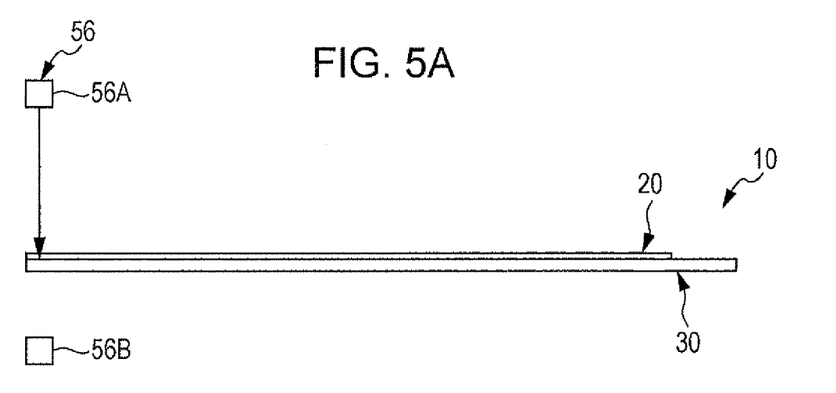
FIGS. 5A and 5B each schematically illustrate an example of how the recording medium according to the exemplary embodiment is detected by an optical sensor.
Figure 5B:
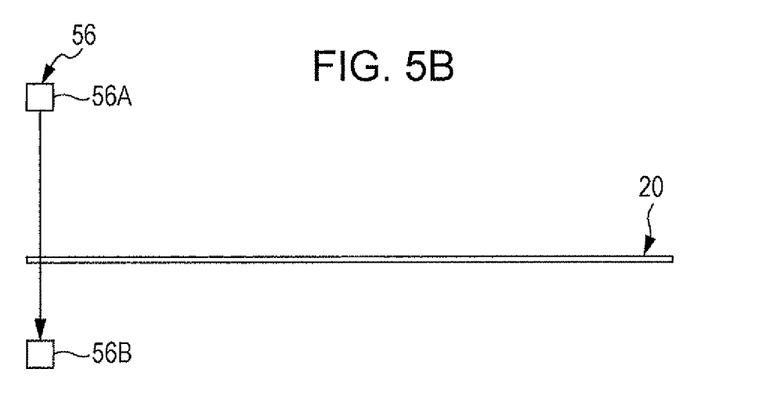

In the exemplary embodiment, the film 20 is stuck on the mount 30. Therefore, as illustrated in FIG. 5A, even in the case of detecting the leading edge, trailing edge, or the like of the recording medium 10 by an optical sensor 56 when recording an image by an electrophotographic image recorder (printer), light from the optical sensor 56 is blocked by the mount 30, and the recording medium 10 is detected properly. That is, in the case of a comparative example in which the recoding medium 10 is configured by only the film 20, as illustrated in FIG. 5B, there is a fear that the light may be transmitted, leading to erroneous detection. The optical sensor 56 is, for example, a transmission or reflection optical sensor 56 having a light emitting unit 56A and a light emitting section 56B.

Figure 6A:
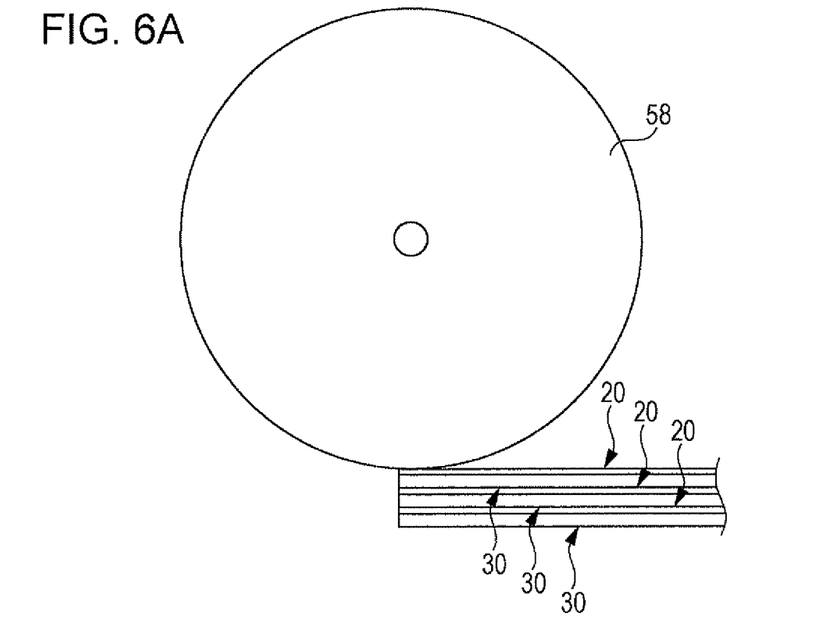
FIGS. 6A and 6B each schematically illustrate an example of how the recording medium according to the exemplary embodiment is fed.
Figure 6B:
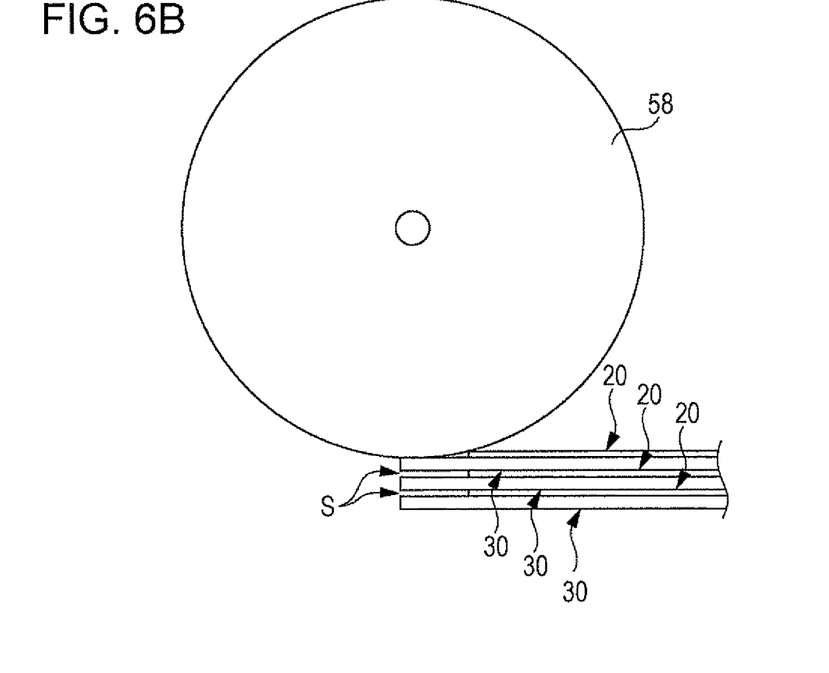

In the exemplary embodiment, as illustrated in FIG. 6A, on the leading edge side with respect to the transport direction of the recording medium 10, the leading edge 30B of the mount 30 and the leading edge 20B of the film 20 are located at substantially the same position. Therefore, when a feed roller 58 that feeds the recording medium 10 contacts the leading edge side from above the recording medium 10, and rotates to feed the recording medium 10, the contact pressure with respect to the recording medium 10 is unlikely to change, thereby reducing misfeed. That is, as illustrated in FIG. 6B, in the case of a comparative example in which the mount 30 extends outside the film 20 on the leading edge side with respect to the transport direction of the recording medium 10, when multiple recording media 10 are overlapped, a gap develops in the portion where the film 20 is not present. This gap S reduces the contact pressure, which affects feeding of the recording medium 10.

In the exemplary embodiment, the mount 30 extends outside the film 20 on the trailing edge side and lateral edge side with respect to the transport direction of the recording medium 10. Therefore, by forming the image G so that the image G extends outside the film 20 toward the mount 30 on the trailing edge side and the lateral edge side with respect to the transport direction (see FIGS. 2A and 2B), a borderless image G is obtained with respect to the film 20.

To record a borderless image on the recording medium 10 by an electrophotographic image recorder (printer), a toner image larger than the width of the recording medium 10 needs to be carried on the image carrier 50. Consequently, toner in the portion of the toner image extending outside the recording medium 10 adheres to the opposed member 52 or the like, and contaminates the succeeding recording medium 10. Thus, anti-contamination measures are required.

(Modifications)

Figure 7:
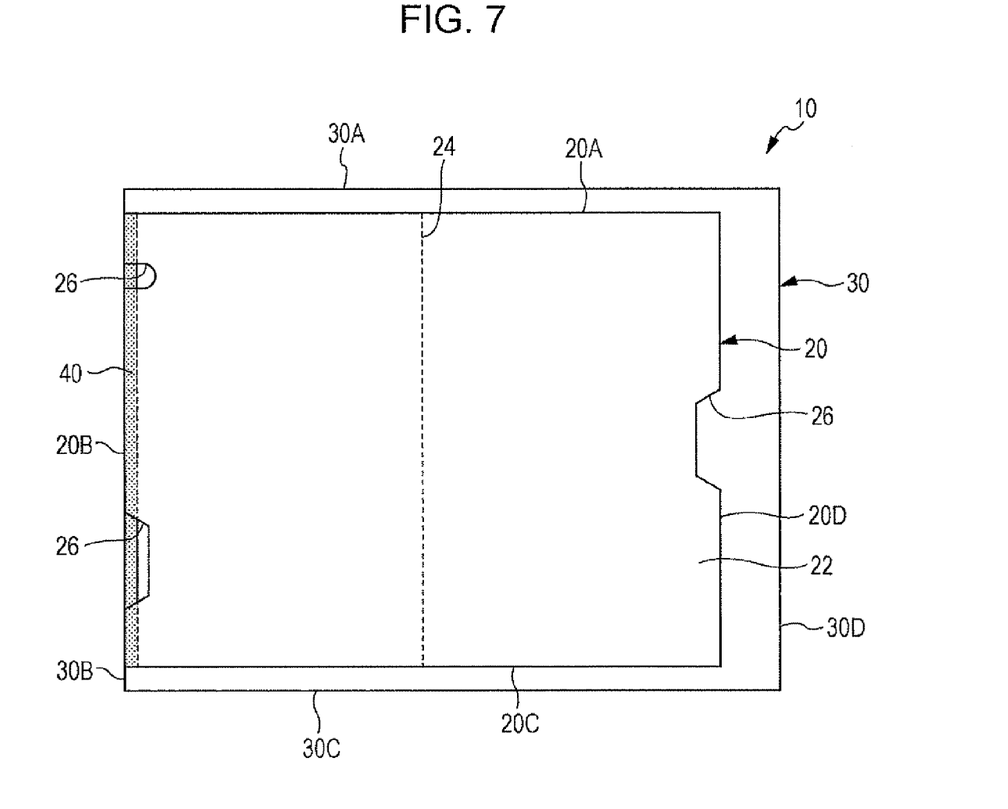
FIG. 7 is a plan view illustrating a modification of the configuration illustrated in FIGS. 1A and 1B, in which a fold line is a perforated line.

The fold line 24 may be, for example, a perforated line as illustrated in FIG. 7. The perforated line is formed by, for example, pressing a cutter having multiple blades on the outer edge of a circular plate against the recording surface 22 of the film 20 while rotating the cutter. In the case of a perforated line as well, by pressing the cutter against the recording surface 20, the recording surface 20 side becomes recessed, resulting in a valley fold with respect to the recording surface 22.

Figure 8A:
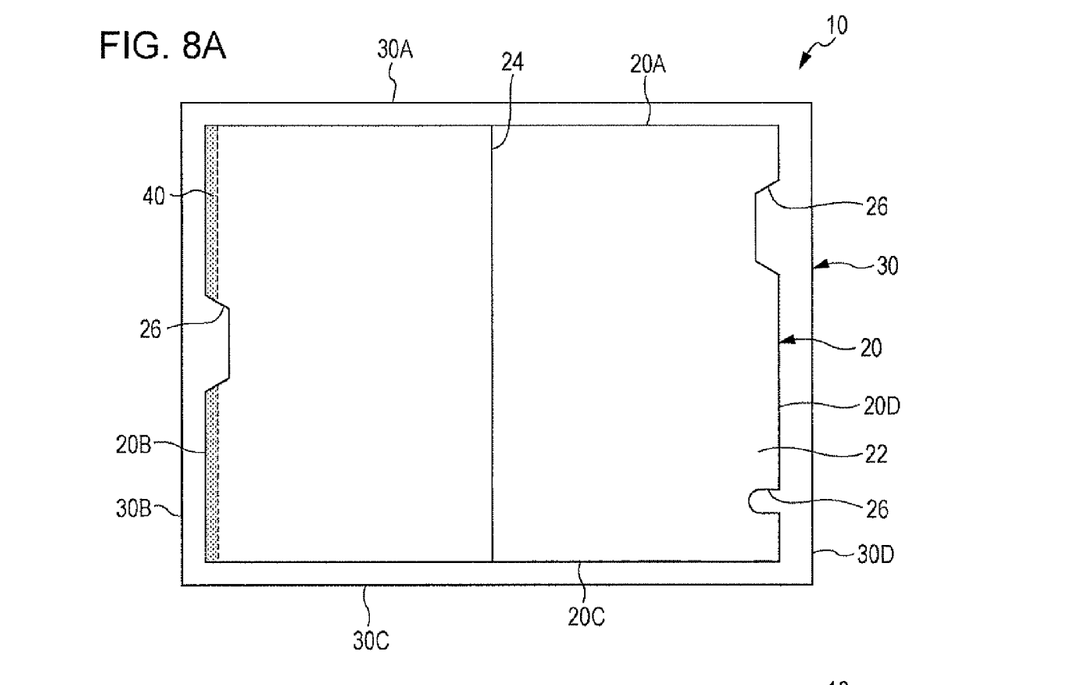
FIGS. 8A and 8B each schematically illustrate a modification of the configuration illustrated in FIGS. 1A and 1B, in which a mount extends outside a film on the leading edge side of the recording medium with respect to the transport direction.
Figure 8B:
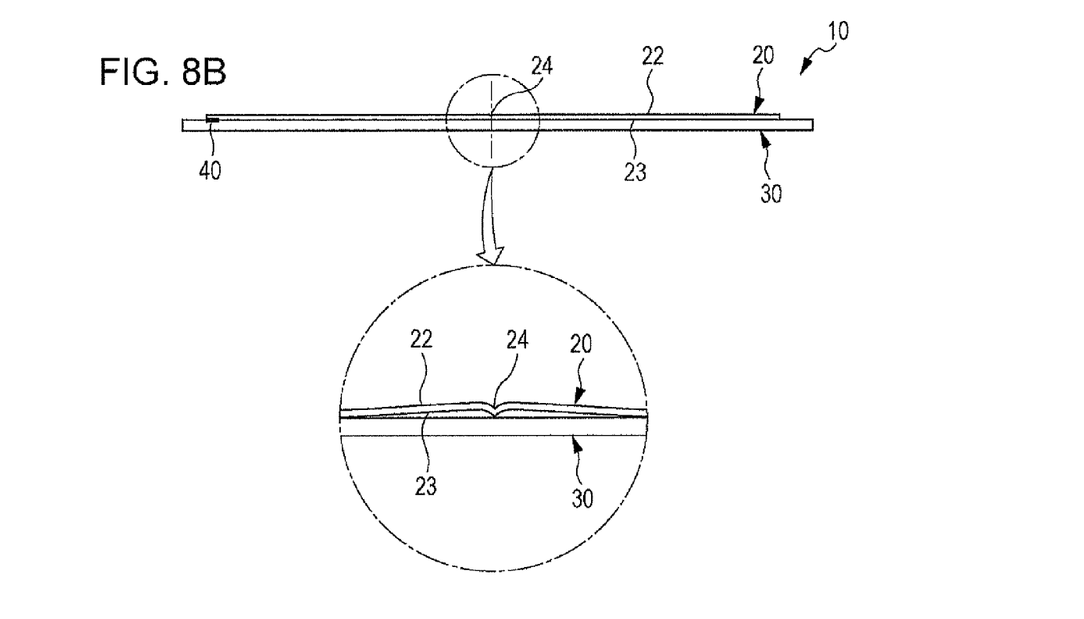

As illustrated in FIGS. 8A and 8B, the recording medium 10 may be configured so that the mount 30 extends outside the film 20 on the leading edge side with respect to the transport direction of the recording medium 10. According to this configuration, by forming an image so that the image extends outside the film 20 toward the mount 30 also on the leading edge side with respect to the transport direction of the recording medium 10, a borderless image is obtained with respect to the film 20.

Figure 9A:
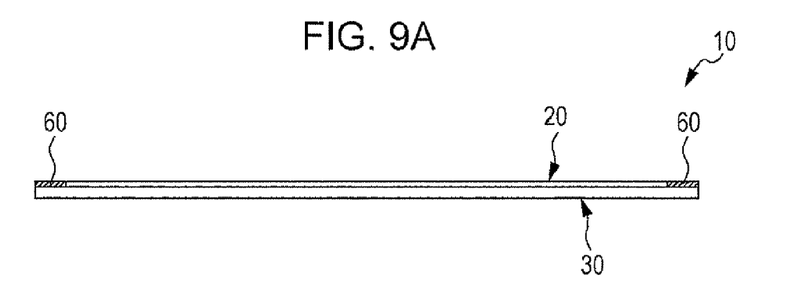
FIGS. 9A and 9B schematically illustrate a modification of the configuration illustrated in FIGS. 1A and 1B, in which a spacer for filling the height difference between the film and the mount is provided on the surface of a portion of the mount which extends outside the film.
Figure 9B:
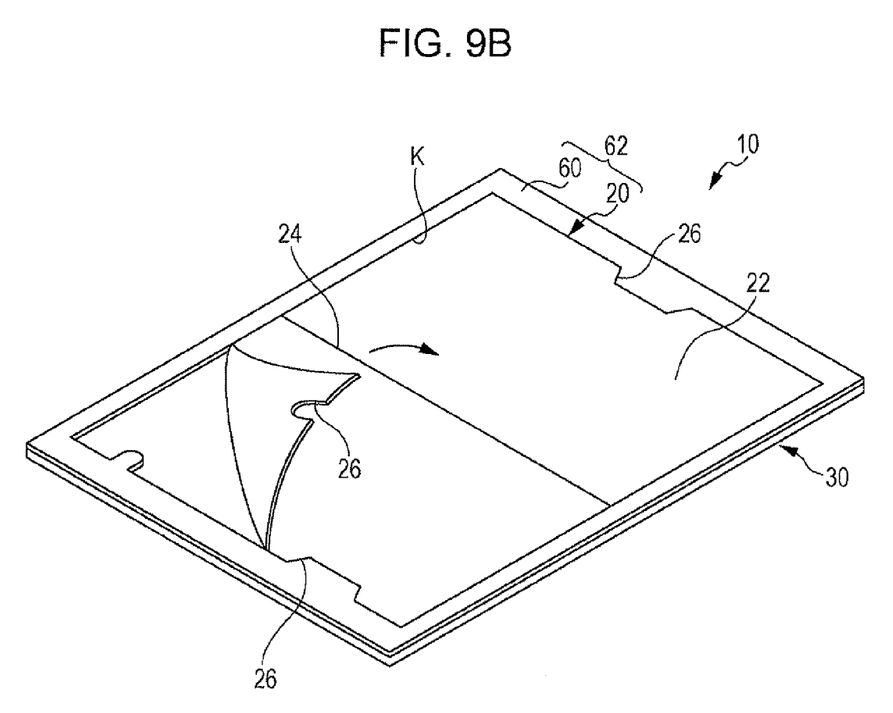

As illustrated in FIG. 9A, the recording medium 10 may further include a spacer 60 provided on the film 20 side surface of the portion of the mount 30 which extends outside the film 20. The spacer 60 is an example of a member that fills the height difference between the above-mentioned surface and the recording surface 22 of the film 20. Specifically, this configuration is accomplished as follows. That is, as illustrated in FIG. 9B, a film 62 of the same size as the mount 30 is releasably stuck on the mount 30. Then, a cut K is made in the film 62 in a frame-like shape, and the film 20 and the spacer 60 are separated from each other. This configuration reduces misfeed, skew, or the like during transport of the recording medium 10 when recording an image.

Figure 10A:
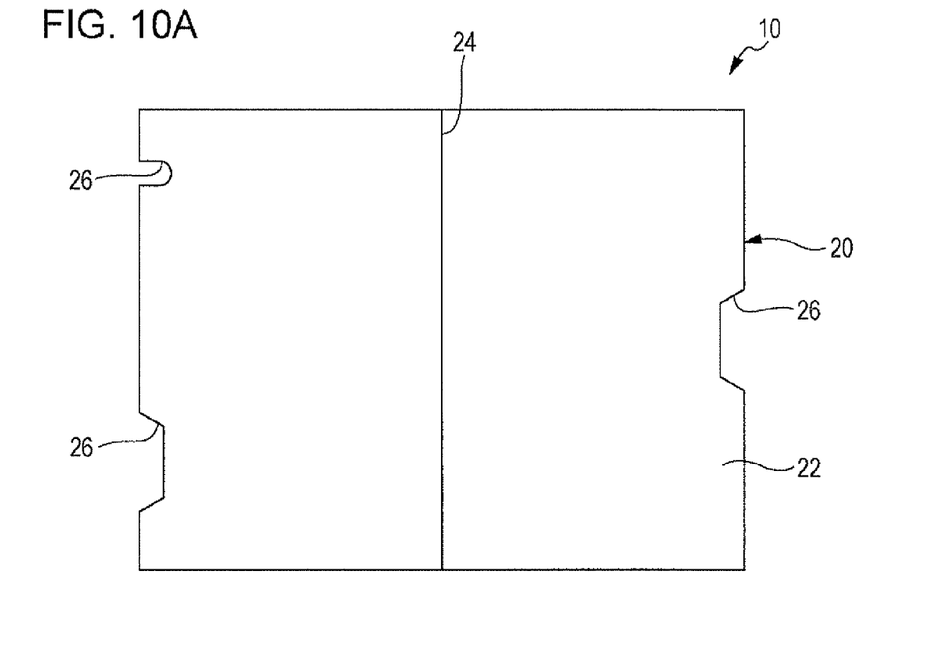
FIGS. 10A and 10B schematically illustrate a modification of the configuration illustrated in FIGS. 1A and 1B, in which the recording medium is configured by only the film.
Figure 10B:
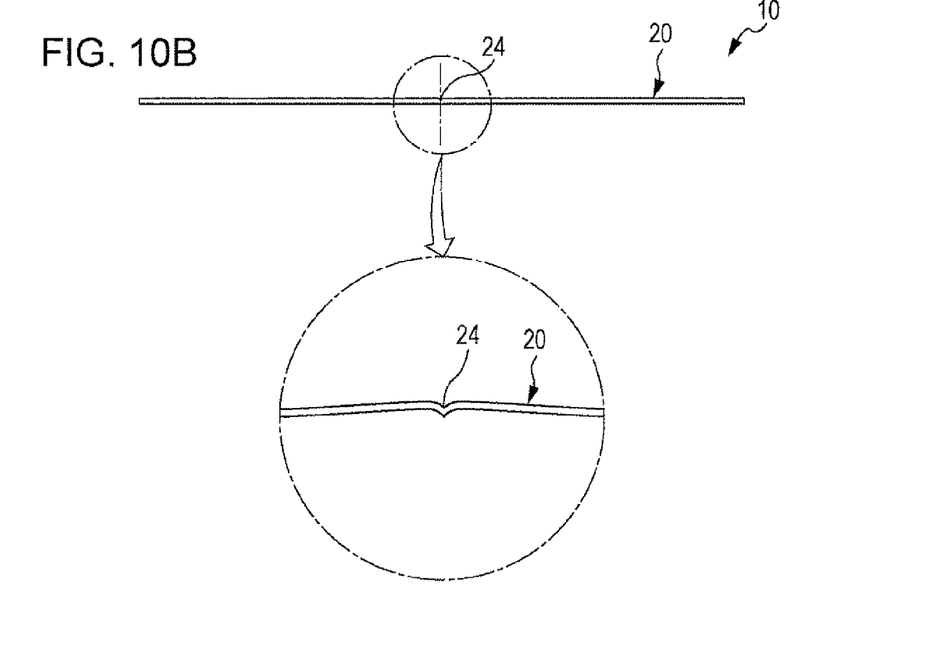

As illustrated in FIGS. 10A and 10B, the recording medium 10 may not have the mount 30 but may include only the film 20. In this configuration, both sides of the film 20 may serve as the recording surface 22.

While the fold line 24 in the recording medium 10 is such that the film 20 is valley folded with respect to the recording surface 22, the film 20 may be mountain folded. Further, the fold line 24 (including a perforated line) in the recording medium 10 may be one that allows both valley folding and mountain folding of the recording medium 10.

The invention is not limited to the exemplary embodiment mentioned above but various modifications, alternations, and improvements are possible. For example, among the modifications described above, multiple modifications may be combined as appropriate.

What is claimed is:

1. A recording medium comprising:
    a film made of a resin material that transmits light that has a recording surface on which an image is recorded, the film including a fold line that is provided in advance at a position where the film is folded when the film is processed into a folder, and
    a mount that is releasably stuck on a side of the film opposite to the recording surface, wherein
        the mount extends outside the film, at a trailing edge and both lateral edges with respect to a direction in which the recording medium is transported when an image is recorded on the recording surface, and
        a member is provided on a surface on the film side of a portion of the mount which extends outside the film, the member filling a height difference between the surface and the recording surface of the film.

2. The recording medium according to claim 1, wherein:
    the film has the recording surface on one side; and
    the fold line is valley folded with respect to the recording surface.

3. The recording medium according to claim 1, wherein:
    in the mount, a leading edge with respect to a direction in which the recording medium is transported when an image is recorded on the recording surface is located at substantially the same position as a leading edge of the film.

* * * * *